United States Patent
Ratliff et al.

(10) Patent No.: US 8,452,014 B2
(45) Date of Patent: May 28, 2013

(54) GROUP KEY MANAGEMENT FOR MOBILE AD-HOC NETWORKS

(75) Inventors: Stan Ratliff, Raleigh, NC (US); Brian E. Weis, San Jose, CA (US); Alvaro Retana, Raleigh, NC (US); Mihail L. Sichitiu, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 377 days.

(21) Appl. No.: 12/491,124

(22) Filed: Jun. 24, 2009

(65) Prior Publication Data

US 2010/0329463 A1    Dec. 30, 2010

(51) Int. Cl.
*H04L 9/00* (2006.01)
*H04L 9/08* (2006.01)
*H04L 9/32* (2006.01)

(52) U.S. Cl.
USPC ............ 380/277; 380/278; 380/279; 713/171

(58) Field of Classification Search
USPC .................................. 380/277–279; 713/171
See application file for complete search history.

(56) References Cited

U.S. PATENT DOCUMENTS

| | | | | |
|---|---|---|---|---|
| 7,065,643 | B1 * | 6/2006 | Cornils et al. | 713/163 |
| 7,355,986 | B2 * | 4/2008 | Vanderveen et al. | 370/255 |
| 7,421,578 | B1 | 9/2008 | Huang et al. | 713/163 |
| 2003/0021416 | A1 * | 1/2003 | Brown et al. | 380/277 |
| 2007/0217611 | A1 * | 9/2007 | Weis | 380/277 |
| 2008/0141064 | A1 * | 6/2008 | Reich et al. | 714/2 |
| 2009/0295617 | A1 * | 12/2009 | Lavedas et al. | 342/22 |
| 2010/0040016 | A1 * | 2/2010 | Lor et al. | 370/331 |

* cited by examiner

*Primary Examiner* — Aravind Moorthy
(74) *Attorney, Agent, or Firm* — Merchant & Gould

(57) ABSTRACT

Group key management in a mobile ad-hoc network (MANET) may be provided. Each network node associated with the MANET may comprise a group distribution key and a list of authorized member nodes from which a group key manager may be elected. The group key manager may periodically issue a new group key to be used in protecting communications among the network nodes. A compromised node may be excluded from receiving updated group keys and thus isolated from the MANET.

19 Claims, 3 Drawing Sheets

GROUP KEY MANAGEMENT FOR MOBILE AD-HOC NETWORKS

TECHNICAL FIELD

The present disclosure relates generally to data communication protocols, and more particularly to protocols applied to ad-hoc networks.

BACKGROUND

In some situations, mobile ad-hoc networks (MANETs) are the only option for communication among nearby cooperating workers. For example, in a search and rescue scenario, there may be no communication infrastructure on which to rely. Thus, the conventional strategy is to deploy a MANET, which can be resilient to disruptions and does not need an established infrastructure. However, this often causes problems because the conventional strategy does not provide the ability to easily encrypt communications among participants in the MANET. For example, a pair-wise key setup would be extremely inefficient, requiring encryption/decryption at each hop and a static pre-shared group key setup cannot easily distribute or revoke group members' keys.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Figure 1:
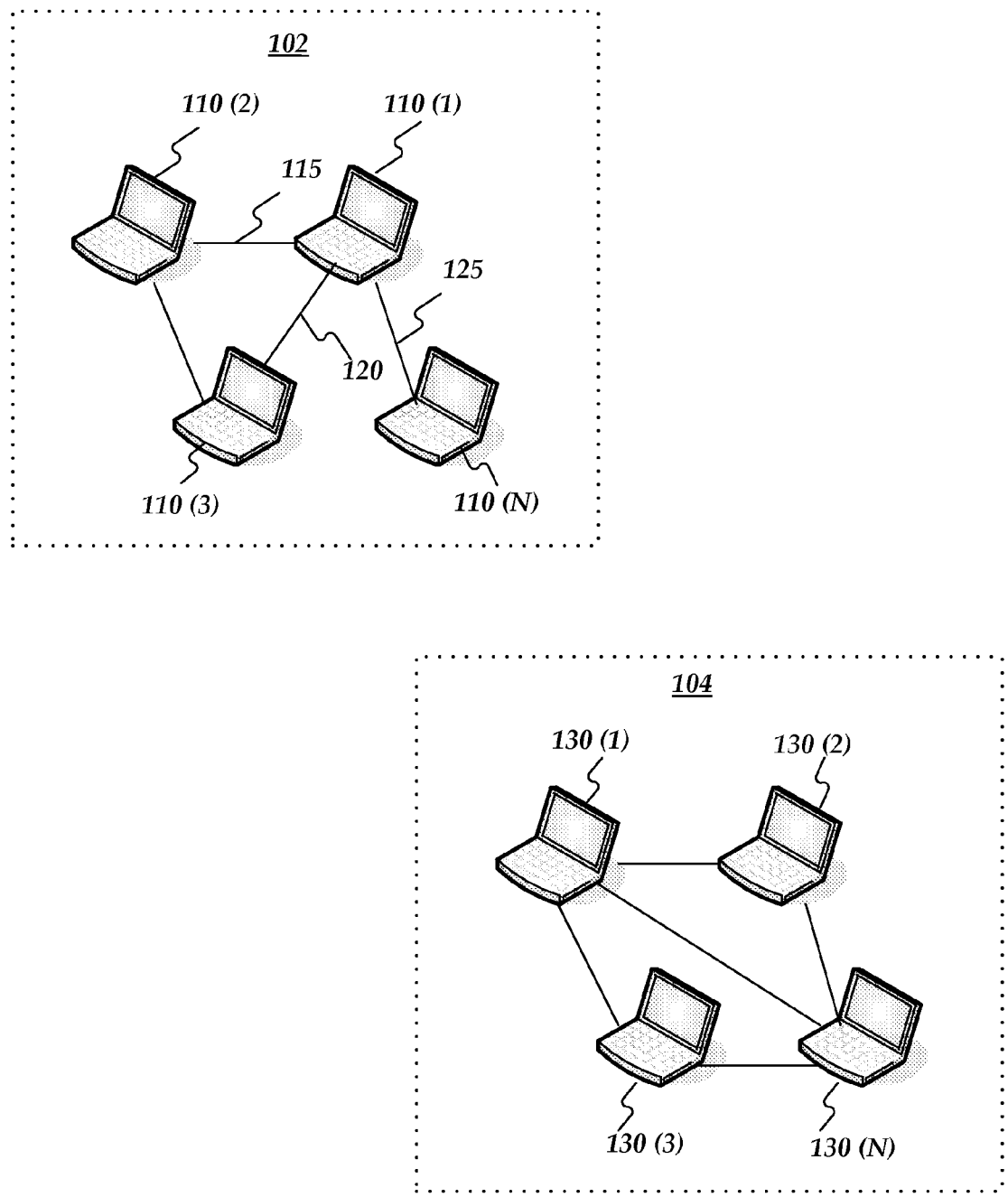
FIG. 1 is a block diagram of an operating environment.

Consistent with embodiments of the present invention, systems and methods are disclosed for providing group key management for mobile ad-hoc networks. Group key management in a mobile ad-hoc network (MANET) may be provided. Each network node associated with the MANET may comprise a group distribution key and a list of authorized member nodes from which a group key manager may be elected. A group key manager may be elected, for example, according to methods and apparatuses described in U.S. Pat. No. 7,421,578, assigned to the common owner of this application, which is hereby incorporated by reference. The group key manager may periodically issue a new group key to be used in protecting communications among the network nodes. A compromised node may be excluded from receiving updated group keys and thus isolated from the MANET.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

DETAILED DESCRIPTION

Group key management for mobile ad-hoc networks (MANETs) may be provided. Consistent with embodiments of the present invention, network nodes may each be provisioned with a list of authorized members of the network and a common group distribution key. The network nodes may elect a group key manager that may periodically distribute a new group key. The group key may be used to protect data communications among the nodes. Consistent with embodiments of the invention, a session key may be derived from the group key and used for communications rather than using the group key directly. Should a node be compromised, other nodes may ban the compromised nodes. A banned node may no longer receive the distributed group keys and so may be denied access to the network's communications. Should the network be disrupted, separate partitions may elect their own group key managers. If and when the disruption is resolved, the network nodes from separated partitions may reconcile their group keys and communicate with each other once more.

FIG. 1 is a block diagram of an operating environment comprising a MANET 100 and illustrating a first network partition 102 and a second network partition 104. First network partition 102 may comprise a plurality of network nodes 110(1) through 110(N). Node 110(1) may be connected to node 110(2) via a connection 115, to node 110(3) via a connection 120, and to node 110(N) via a connection 125. Second network partition 104 may comprise a plurality of network nodes 130(1) through 130(N).

Each of the network nodes may be connected to at least one other network node via a wireless connection and/or may operate in the absence of an active connection to another node. An ad-hoc network may comprise a decentralized wireless network wherein each network node may forward data destined for other network nodes. Each node in MANET 100 may comprise a mobile device, such as a laptop, personal digital assistant (PDA), or cellular telephone and may communicate with other nodes in MANET 100 via a wireless link. MANET 100 may be self-configuring utilizing an ad-hoc protocol such as optimized link state routing (OLSR), mobile mesh routing protocol (MMRP), ad-hoc wireless distribution service (AWDS), or a number of similar protocols.

Figure 2:
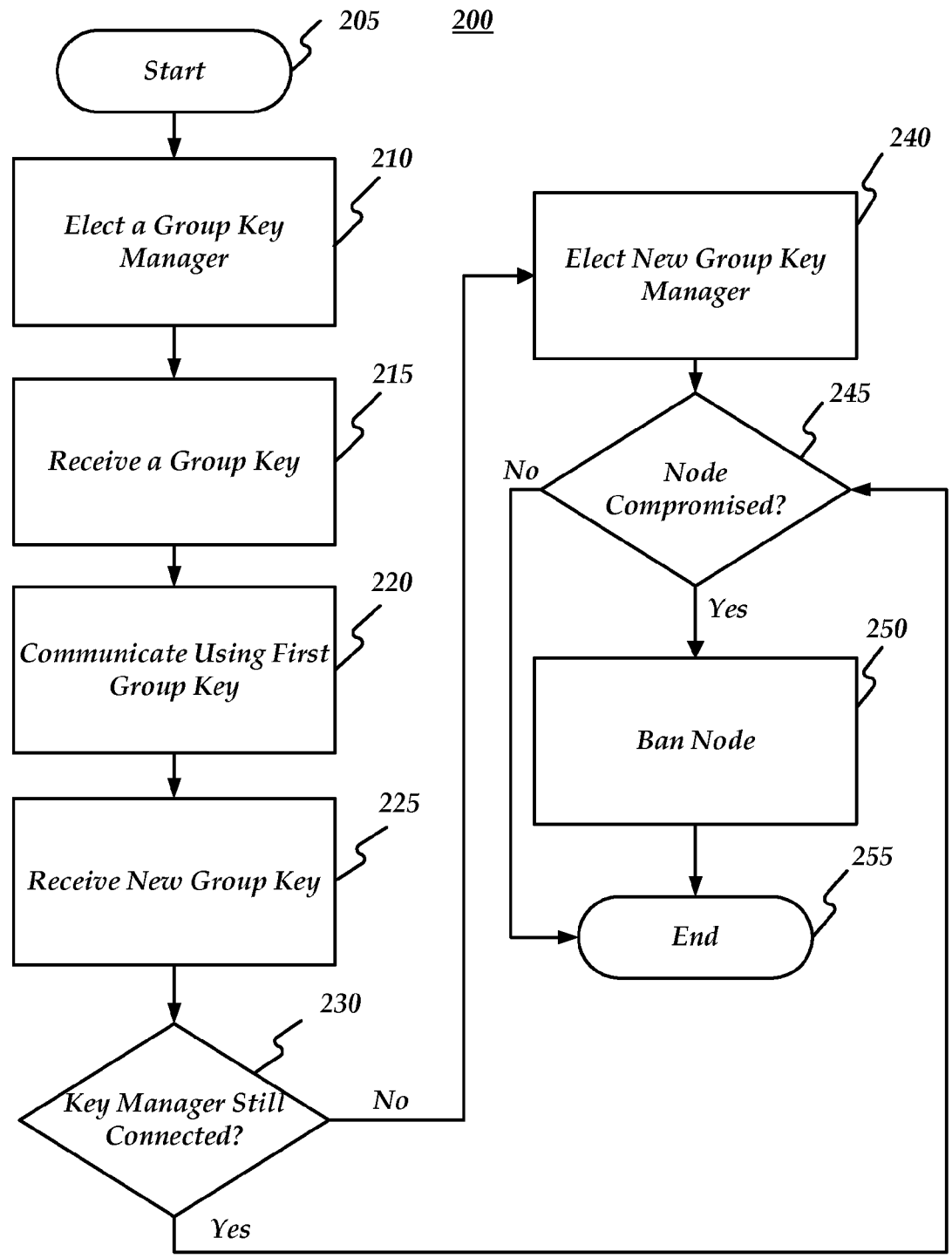
FIG. 2 is a flow chart of a method for providing group key management in a MANET.

FIG. 2 is a flow chart setting forth the general stages involved in a method 200 consistent with an embodiment of the invention for providing group key management in a MANET. Method 200 may be implemented using a computing device 300 as described in more detail below with respect to FIG. 3. Ways to implement the stages of method 200 will be described in greater detail below. Computing device 300 may comprise, for example, one of a plurality of network nodes deployed in MANET 100, such as one of nodes 110(1)-110(N) and 130(1)-130(N). Each node of MANET 100 may comprise a private key paired with a public key that may be used for authentication and secure communication between neighboring nodes. The nodes may be provisioned with a list of authorized members comprising a unique member identifier (e.g. a MAC address for each node in the network), a public key for each member, a banning weight for the member's ability to ban other members, a banning requirement for other members to ban the member, and/or a priority of each member. Each node may be provisioned with a group distribution key. The list of authorized members and the group distribution key may be provided to the network nodes prior to setting up the MANET, for example, over a wired network from a server at a central deployment location.

Method 200 may begin at starting block 205 and proceed to stage 210 where computing device 300 may elect a group key manager. For example, in MANET 100, network partition 102 may elect node 110(1) as the group key manager. Separated network partitions may each elect their own group key manager. For example, network partition 104 may elect node 130(1) as the group key manager for network partition 104.

Consistent with embodiments of the invention, election of a group key manager may be accomplished according to a hierarchy of assigned priorities. These priorities may be assigned prior to deployment when the network nodes are provisioned with the group distribution key. Higher priority nodes may take precedence in being elected the group key manager over lower priority nodes. For example, node 110(1) may have an assigned priority of three due to being assigned to a supervisor, while nodes 110(2) and 110(3) have assigned priorities of one. Node 110(1) may then be elected the group key manager for network partition 102.

Consistent with further embodiments of the invention, a degree of connectivity may be determined for each node, and the node with greatest degree of connectivity may be elected the group key manager. For example, node 110(1) may have a one-hop connection to each node in network partition 102, resulting in the election of node 110(1) as the group key manager. For another example, a sum of a node's connectivity to its neighbors may be used to determine the node's suitability as a group key manager, such as where node 110(2) may have a far higher wireless signal strength over its connections to node 110(1) and 110(3), that may be sufficient to be elected the group key manager despite node 110(1) having a greater number of individually weaker connections.

These metrics for electing the group key manager may be configurable as to the weight each factor may be given. For example, where node 110(1) and node 110(2) have an equal priority, the number of connections of node 110(1) may be used as a tiebreaker resulting in the election of node 110(1) as the group key manager.

Upon initialization of each node's network connection, if the node does not hear a key distribution message, it may enter a group key manager election procedure. The node may select a random backoff time between 0 and P, where P is a fixed key distribution period. If, during this time, the node does not receive a group key from a node with a higher election metric as described above, the node may declare itself a group key manager and may begin periodically broadcasting group keys. Within the configurable period P, the group key manager may broadcast a group key to the network, at the same time asserting its dominance as a group key manager. As long as no other node with a higher election metric joins the partition, the node may continuously generate keys and distribute them in the network.

Consistent with embodiments of the invention, a group key manager's election metric may continuously decrease while it is the group key manager and increase when it is not the group key manager. This may allow nodes to rotate in the position of group key manager.

If a new node with a higher election metric than the current group key manager joins the network, upon the receipt of the periodic broadcast message, the new node may broadcast the same key as received to the network, but with the claim to be a new group key manager. The former group key manager with a smaller metric may receive the message and may cease being group key manager. To avoid interruptions during transition periods (for example, if the propagation time of the broadcast is larger than the periodic key renewal time), the nodes may store several past keys.

Further consistent with embodiments of the invention, a threshold in the election metric necessary to claim election as the group key manager may be imposed. For example, the new node may need an election metric at least 30% higher than the current one.

From stage 210, method 200 may advance to stage 215 where computing device 300 may receive a group key from the group key manager. For example, network node 110(1) may be elected as the group key manager and may distribute the group key to network nodes 110(2), 110(3), and 110(N). The group key may be periodically refreshed, for example, by broadcasting a new group key to all connected network nodes at a predetermined interval. Consistent with embodiments of the invention, the interval may comprise a base interval modified each period by a random, varying, and/or alternating amount.

The key distribution from the group key manager may use network broadcast (e.g., flooding). For example, the key distribution may comprise a broadcast from each node and/or a relay election strategies, such as in Open Shortest Path First (OSPF) extensions for MANET. The key distribution packet may include fields comprising a member identifier of the current group key manager, the current election metric of the current group key manager, the new group key computed by the group key manager to be distributed in the group, and a signature authenticating the group key manager (e.g., a hash of the previous fields encrypted with the private key of the group key manager). These fields may be encrypted with the group distribution key.

A node may query a neighbor for the current group key. Upon the receipt of such a query (the query may be broadcast and/or unicast) the neighbor may forward the last group key it received after authenticating the node requesting the key.

From stage 215, where computing device 300 received a first group key from a group key manager, method 200 may advance to stage 220 where computing device 300 may communicate with a plurality of network nodes using the first group key. For example, node 110(1) may encrypt data packets destined for node 110(2) using the first group key and may decrypt data packets received from node 110(3) using the first group key.

Consistent with embodiments of the invention, the group key may comprise an encryption/decryption key associated with a symmetric key algorithm. Symmetric-key algorithms are a class of algorithms for cryptography that may use related and/or identical cryptographic keys for both decryption and encryption. A transform may be used to go between the encryption and decryption keys. The keys may represent a shared secret between nodes that may be used to maintain a private information link. For example, symmetric key algorithms may include Advanced Encryption Standard (AES), Data Encryption Standard (DES), triple-DES, RC4, RC5, and Secure Hash Algorithm (SHA) used with a Hash Message Authentication Code (HMAC) construction.

From stage 220, method 200 may continue to stage 225 where computing device 300 may receive an updated and/or new group key from the group key manager. The new group key may be distributed via a network broadcast and/or relay, as described above. Periodically refreshing the group key may help ensure confidentiality of the data in cases where a group key becomes compromised.

After computing device 300 receives a new group key in stage 225, method 200 may advance to stage 230 where computing device 300 may determine whether the group key manager is still connected. For example, network partition 102 and network partition 104 may initially be communicatively connected via a wireless link between node 110(1) and node 130(1). Node 110(1) may be elected the group key manager according to the election metrics described above and may distribute group keys to each of the nodes in partitions 102 and 104. At a later time, a network disruption may occur between partition 102 and partition 104, such as by node 110(1) and node 130(1) moving out of range of each other. Node 130(1) may determine that the group key manager, node 110(1) is no longer connected, for example, by not receiving a new group key within an expected time period.

Consistent with embodiments of the invention, if a node does not receive a new key for more than $\alpha P$ seconds, where $\alpha > 1$, it may determine that the former group key manager is no longer part of the partition and may initiate a group key manager election. In the meantime, the node may use the old group key. $\alpha$ may be larger than 1 (e.g., 3-4) and/or a query of neighboring nodes may be employed to make sure that a key distribution message was not lost due to unreliable wireless transmissions. After the partitions separate, the original group key manager may remain active in its network partition. For example, node 110(1) may remain the group key manager for partition 102. The two corresponding group key managers may generate different group keys. If the two partitions rejoin (or simply exchange members), it may be necessary to reconcile the two different group keys. Two members that come in wireless range may detect each other. This mechanism may be provided by a physical radio, layer two scheme, and/or a periodic (e.g. 1-10 s) broadcast beacon including their identity. The identity may be encrypted, such as with the broadcasting node's private key.

Each node may broadcast a nonce (i.e. a number used once, a random or pseudo-random number issued in an authentication protocol to ensure that old communications cannot be reused in replay attacks) encrypted and signed with the private key of the node. Any node receiving the broadcast may decrypt the beacon, retrieve the nonce, add one to the nonce, then encrypt and sign it with its own private key before returning it to the originator. This way both nodes may verify that the two parties have valid private keys corresponding to the public keys in their list. Once two nodes detect that they are in wireless range and using different group keys, the nodes may exchange group distribution keys (if they are different) and then group keys. For the exchange, public key encryption may be used. Once the group keys, the election metrics, and the identities of the two group key managers are exchanged, the node with the group key manager with the lower metric may re-flood the new group key together with the new group key manager in its partition. That partition may thus become part of the group with the stronger group key manager.

Further consistent with embodiments of the invention, node 130(1) may determine a loss of connection when data destined for delivery to node 110(1) becomes undeliverable and/or through other topology exploration means provided by various MANET protocols. If computing device 300 determines that the group key manager is no longer connected in stage 230, method 200 may proceed to stage 240 where computing device 300 may elect a new group key manager. For example, if node 130(1) determines that the group key manager is no longer connected, node 130(1) may initiate a new group key manager election process.

Once a new group key manager is elected in stage 240, or if no disruption to the existing group key manager is detected at stage 230, method 200 may advance to stage 245 where computing device 300 may determine whether a node in the network has been compromised. For example, node 110(1) may receive information that node 110(2) has been lost and/or stolen.

If, at stage 245, computing device 300 determines that a node has been compromised, method 200 may advance to stage 250, where computing device 300 may ban the compromised node. Banning the node may comprise revoking the node's authorization to participate in MANET 100. For example, node 110(2) may determine that node 110(3) has been compromised. Node 110(2) may broadcast to node 110(1), which may be the group key manager, and node 110(N) that node 110(2) has been compromised.

Node 110(2) may broadcast a banning message comprising its identity, the identity of the node to be banned, and/or a signature using the private key of node 110(2). The banning message may be broadcast to all other nodes in the network and/or partition, and may be stored for future use as a list of banned nodes. For example, if two partitions later merge, nodes from both partitions may exchange and synchronize lists of banned nodes. The synchronized lists may be re-broadcast if new banned nodes are seen.

Consistent with embodiments of the invention, a single node may exclude the compromised node and/or a group of nodes with a sufficient banning weight may exclude the compromised node. Each node may comprise a banning weight quantifying the node's ability to ban other nodes and a banning requirement other nodes must meet before banning the node. For example, node 110(1) may comprise a banning weight of 2 and a banning requirement of 3, while node 110(2) and node 110(3) may comprise a banning weight of 1 and a banning requirement of 2. Thus, node 110(2) and node 110(3) may need support from another node with a banning weight of at least 1 before their cumulative banning weight was sufficient to ban node 110(1) (the cumulative weight may need to be equal and/or greater to the banning requirement). Node 110(1), however, may use its banning weight of 2 to ban node 110(2) and/or node 110(3) on its own.

If the group key manager determines that a sufficient banning weight has been reached, the group key manager may distribute a new group distribution key to the non-compromised nodes, specifically excluding the compromised node. Each node that receives a new group distribution key may unicast it separately to each of its neighbors, and may skip the nodes that are banned in its own list. A full synchronization of the banned list may be performed before forwarding the key. The new group distribution key may be encrypted separately using the public key of the neighbor, thus avoiding sniffing by any of the banned nodes. If the banned node is the group key manager and there are enough banning messages in the network with enough banning weight to ban the group key manager, the nodes may ignore any further commands from the current group key manager and may elects a new group key manager.

If a new partition joins the partition with the new key distribution, the new group distribution key may be forwarded to the new group immediately after the two groups recognize each other as friendly, but before the new group key is sent. The compromised node may be removed from the list of authorized members of the network, such as by removing the node's member identifier and/or associated information from the previously provisioned member list.

Changes to the list of authorized members may be distributed through the network. For example, changes may comprise the addition of new nodes, deletion of nodes that are known to have failed, and/or changes in banning weights. The system for deciding who may change an entry may be similar to the one required for banning. The list of member nodes, the list of modifications, and the list of bans may be signed entries in a database that may be synchronized when two partitions merge (similar to OSPF database synchronization before nodes become adjacent).

Consistent with embodiments of the invention, a node previously determined to be compromised may be permitted to rejoin the network. For example, a lost laptop comprising node 110(2) may be recovered. Although the original member identifier for node 110(2) may have been removed from the list of authorized nodes and/or added to a list of banned nodes, node 110(2) may be issued a new member identifier. The new member identifier may comprise a newly provisioned identifier in the list of authorized members and/or may comprise an existing, unassigned member identifier in the originally provisioned list of authorized members.

Once computing device 300 bans the compromised node in stage 250, or if no compromised nodes are determined in stage 245, method 200 may then end at stage 255. Consistent with embodiments of the invention, computing device 300 may revisit the stages of method 200 multiple times and/or in varying order. For example, method 200 may return to stage 230 if no compromised nodes are determined in stage 245. From stage 230, if the key manager is still connected, method 200 may return to stage 225 where computing device 300 may receive a new group key from the key manager before returning to stage 220 and communicating using the newly received group key.

An embodiment consistent with the invention may comprise a system for providing group key management. The system may comprise a memory storage and a processing unit coupled to the memory storage. The processing unit may be operative to provision each of a plurality of network nodes with at least one group distribution key, deploy the plurality of network nodes as a ad-hoc network, and elect at least one first network node as a first group key manager.

Another embodiment consistent with the invention may comprise a system for providing group key management The system may comprise a memory storage and a processing unit coupled to the memory storage. The processing unit may be operative to communicate over an ad-hoc network, encrypt data packets using a group key, send data packets other network nodes, receive data packets encrypted using the group key, decrypt the data packets using the group key, and receive a new group key from a group key manager.

Yet another embodiment consistent with the invention may comprise a system for providing group key management. The system may comprise a memory storage and a processing unit coupled to the memory storage. The processing unit may be operative to receive a group key from a group key manager, use the first group key to encrypt and decrypt data communications among a plurality of network nodes, receive a second group key from the group key manager, use the second group key to encrypt and decrypt data communications among the plurality of network nodes, and determine whether the group key manager is no longer communicatively connected to the ad-hoc network. In response to determining that the group key manager is no longer communicatively connected to the ad-hoc network, the processing unit may be operative to elect a new group key manager. The processing unit may be further operative to determine whether one of the plurality of network nodes comprises a compromised network node and revoke the authorized member identifier associated with the compromised network node.

Figure 3:
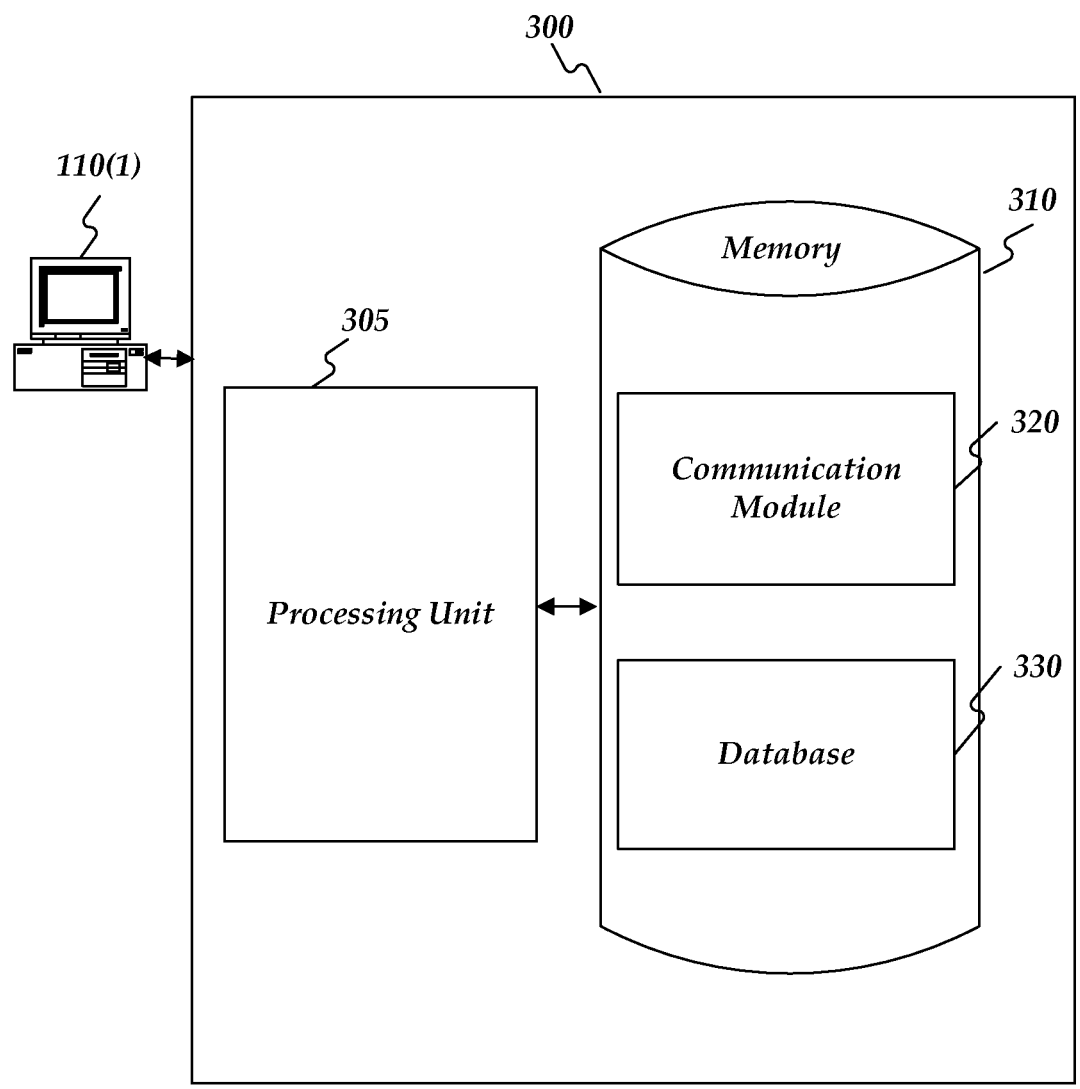
FIG. 3 is a block diagram of a system including a computing device.

FIG. 3 is a block diagram showing computing device 300. Network nodes 110(1)-110(N) and nodes 130(1)-130(N) may each comprise a construction similar to computing device 300. As shown in FIG. 3, computing device 300 may include a processing unit 305 and a memory 310. Memory 310 may include a communication module 320 and a database 330. While executing on processing unit 305, communication module 320 may perform, for example, one or more of method 200's stages described above with respect to FIG. 2. Any suitable combination of hardware, software, and/or firmware may be used to implement the memories, processing units, or other components.

Any of the nodes (i.e. "the processors") included in MANET 100 may be implemented using a personal computer, network computer, mainframe, or other similar microcomputer-based device. The processors may comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, the processors may comprise a mobile terminal, such as a smart phone, a cellular telephone, a cellular telephone utilizing wireless application protocol (WAP), personal digital assistant (PDA), intelligent pager, portable computer, a hand held computer, a laptop, a conventional telephone, or a facsimile machine. The aforementioned systems and devices are examples and the processors may comprise other systems or devices.

MANET 100 may communicate, for example, over a wireless communications system, or a combination of wire line and wireless may be utilized in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g., general packet radio system (GPRS), enhanced data rates for global evolution (EDGE), global system for mobile communications (GSM), code division multiple access (CDMA), long term evolution (LTE)), a wireless local area network interface (e.g., WLAN, IEEE 802), a Bluetooth interface, another RF communication interface, and/or an optical interface.

Nodes in MANET 100 may also transmit data by other methods and processes. These methods and processes may include, but are not limited to, transferring data via, diskette, flash memory sticks, CD ROM, facsimile, conventional mail, an interactive voice response system (IVR), or via voice over a publicly switched telephone network.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing group key management, the method comprising:
provisioning each of a plurality of network nodes with at least one group distribution key;
deploying the plurality of network nodes as a ad-hoc network;
assigning a weight to each node of the plurality of network nodes according to a number of connections to others of the plurality of network nodes and a wireless signal strength to at least one other of the plurality of network nodes; and
electing at least one first network node as a first group key manager, wherein the at least one first network node comprises a highest weight of the plurality of network nodes, wherein electing the at least one first network node as the first group key manager comprises:
selecting a random backoff time between zero and a fixed key distribution period; and
when, during the backoff time, the first group key manager does not receive a new group distribution group key having the highest weight, electing the at least one first network node as the first group key manager and a new group key to each of the plurality of nodes.

2. The method of claim 1, further comprising:
determining whether a network disruption has occurred between the at least one first network node and a second network node; and
in response to determining that the network disruption has occurred between the at least one first network node and the second network node, electing a third network node as a second group key manager.

3. The method of claim 2, wherein the second network node and the third network node participate in the election of the second group key manager.

4. The method of claim 2, wherein the network disruption comprises the at least one first network node being out of range of the second network node and the third network node.

5. The method of claim 1, wherein the first group key manager issues the new group key on a periodic basis.

6. The method of claim 1, further comprising:
determining, by a second network node, whether a third network node comprises a compromised network node; and in response to determining that the third network node comprises a compromised network node, banning the compromised network node from communicating with the second network node.

7. The method of claim 6, further comprising:
determining whether a number of nodes banning the compromised network node comprises a predetermined weight requirement to revoke the compromised network node's access; and
in response to determining that the number of nodes banning the compromised network node comprises the predetermined weight requirement to revoke the compromised network node's access, issuing a new group key to at least one non-compromised node of the plurality of network nodes.

8. The method of claim 6, further comprising:
determining whether the compromised network node is no longer compromised; and
in response to determining that the compromised network node is no longer compromised, issuing a new member identifier to the compromised network node.

9. The method of claim 8, further comprising removing at least one of the others of the plurality of network nodes from the list in response to banning the at least one of the others of the plurality of network nodes.

10. The method of claim 1, wherein each of the plurality of network nodes comprises a list of each of the plurality of network nodes and wherein the list comprises, for each of the plurality of network nodes, a member identifier, a priority, a public key, and a banning weight.

11. A system for providing group key management, the system comprising:
a memory storage; and
a processing unit coupled to the memory storage, wherein the processing unit is operative to:
communicate over an ad-hoc network comprising at least one authorized network node, wherein being operative to communicate over the ad-hoc network comprises being operative to:
select a random backoff time between zero and a fixed key distribution period;
elect a group key manager, wherein the group key manager comprises a weight computed according to a number of connections and a wireless signal strength, when, during the backoff time, the first group key manager does not receive a new group distribution group key having the highest weight, elect the at least one first network node as the first group key manager and a new group key to each of the plurality of nodes,
encrypt a first data packet using a group key,
send the first data packet to the at least one authorized network node,
receive a second data packet encrypted using the group key, and
decrypt the second data packet using the group key; and
receive a new group key from the group key manager.

12. The system of claim 11, wherein being operative to encrypt the first data packet and decrypt the first data packet comprises being operative to utilize a symmetric key algorithm.

13. The system of claim 12, wherein the symmetric key algorithm comprises at least one of the following: Advanced Encryption Standard (AES), Data Encryption Standard (DES), triple-DES, RC4, RC5, and Secure Hash Algorithm (SHA) used with a Hash Message Authentication Code (HMAC) construction.

14. The system of claim 11, further operative to:
receive a group distribution key common to the system and the at least one authorized network node; and
authenticate the new group key using the group distribution key.

15. The system of claim 11, wherein the group key manager is operative to issue the new group key.

16. The system of claim 15, wherein being operative to elect the group key manager comprises being operative to select a network node of the ad-hoc network to serve as the group key manager according to at least one of the following: a degree of connectivity between the network node and the system and a priority assigned to the network node.

17. The system of claim 11, further operative to:
determine whether the new group key has not been received within a key distribution period; and
in response to determining that the new group key has not been received within the key distribution period, elect the system as the group key manager and issue the new group key to the at least one authorized network node.

18. The system of claim 11, further operative to:
determine whether the group key manager is no longer connected to the ad-hoc network; and
in response to determining that the group key manager is no longer connected to the ad-hoc network, initiate an election of a new group key manager.

19. A non-transitory computer-readable medium which stores a set of instructions which when executed performs a method for providing group key management in an ad-hoc network, the method executed by the set of instructions comprising:
assigning a weight to each node of the plurality of network nodes according to a number of connections to others of the plurality of network nodes and a wireless signal strength to at least one other of the plurality of network nodes;
receiving a first group key from a group key manager, wherein the group key manager comprises a highest weight of the plurality of network nodes;
using the first group key to encrypt and decrypt data communications among the plurality of network nodes, wherein each of the plurality of network nodes comprises at least one of a plurality of authorized member identifiers;
selecting a random backoff time between zero and a fixed key distribution period;
receiving, within the random backoff time, a second group key from the group key manager, the second group key having a higher weight than the highest weight;
using the second group key to encrypt and decrypt data communications among the plurality of network nodes;
determining whether the group key manager is no longer communicatively connected to the ad-hoc network;
in response to determining that the group key manager is no longer communicatively connected to the ad-hoc network, electing a new group key manager;
determining whether at least one of the plurality of network nodes comprises a compromised network node; and
in response to determining that at least one of the plurality of network nodes comprises a compromised network node, revoking the authorized member identifier associated with the compromised network node.

* * * * *